US010437715B2

(12) United States Patent
Christiansen et al.

(10) Patent No.: US 10,437,715 B2
(45) Date of Patent: *Oct. 8, 2019

(54) VERIFICATION THAT PARTICULAR INFORMATION IS TRANSFERRED BY AN APPLICATION

(71) Applicant: Microsoft Technology Licensing, LLC, Redmond, WA (US)

(72) Inventors: Dave Christiansen, Woodinville, WA (US); Bethan Tetrault Cantrell, Redmond, WA (US); Michelle R. Bruno, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 234 days.

This patent is subject to a terminal disclaimer.

(21) Appl. No.: 15/473,245

(22) Filed: Mar. 29, 2017

(65) Prior Publication Data

US 2017/0206156 A1  Jul. 20, 2017

Related U.S. Application Data

(63) Continuation of application No. 14/019,978, filed on Sep. 6, 2013, now Pat. No. 9,645,860.

(51) Int. Cl.
*G06F 9/44* (2018.01)
*G06F 11/36* (2006.01)
(Continued)

(52) U.S. Cl.
CPC ............ *G06F 11/3688* (2013.01); *G06F 9/54* (2013.01); *G06F 21/57* (2013.01); *G06F 21/6245* (2013.01); *G06F 2221/031* (2013.01)

(58) Field of Classification Search
CPC ............................... G06F 8/20; G06F 11/3672
See application file for complete search history.

(56) References Cited

U.S. PATENT DOCUMENTS 7,788,328 B2   8/2010  Ramanathan et al.
8,275,358 B1   9/2012  Adelson
(Continued)

FOREIGN PATENT DOCUMENTS

CN    101064604 A    10/2007
CN    101668157 A     3/2010
(Continued)

OTHER PUBLICATIONS

Hong, et al., "Privacy Risk Models for Designing Privacy-Sensitive Ubiquitous Computing Systems", In Proceedings of the 5th Conference on Designing Interactive Systems: Processes, Practices, Methods, and Techniques, Aug. 1, 2004, 10 pages.

(Continued)

Primary Examiner — Duy Khuong T Nguyen
(74) Attorney, Agent, or Firm — Alleman Hall Creasman & Tuttle LLP

(57) ABSTRACT

The technology includes a method to test what information an application transfers to an external computing device. A user's consent is explicitly obtained before the application transfers certain types of information, such as sensitive information. When a determination is made that an application is transferring sensitive information, a prompt for consent from a user may be provided that is accurate and detailed. In pre-production environments, technology can be used to detect whether this sensitive information is being transferred, and to validate whether a prompt for consent is necessary or unnecessary. To determine this, shimming is used to intercept application calls to APIs that return sensitive information. Requested sensitive information may be substituted with recorded or forged information from those (Continued)

APIs to produce a sentinel or canary. Similarly, network traffic of the application may be analyzed by another shim to determine when the substitute information is present.

17 Claims, 8 Drawing Sheets

(51) Int. Cl.
- *G06F 9/54* (2006.01)
- *G06F 21/62* (2013.01)
- *G06F 21/57* (2013.01)

(56) References Cited

U.S. PATENT DOCUMENTS

| | | | |
|---|---|---|---|
| 9,432,627 | B2 | 8/2016 | Christiansen et al. |
| 9,645,860 | B2 | 5/2017 | Christiansen et al. |
| 2002/0120854 | A1* | 8/2002 | LeVine .................. G06F 21/10 713/189 |
| 2004/0015547 | A1 | 1/2004 | Griffin et al. |
| 2004/0181688 | A1* | 9/2004 | Wittkotter ............... G06F 21/10 726/26 |
| 2005/0020318 | A1 | 1/2005 | Yomoda |
| 2006/0052091 | A1 | 3/2006 | Onyon et al. |
| 2006/0130121 | A1 | 6/2006 | Candelore et al. |
| 2007/0199074 | A1* | 8/2007 | LeVine .................. G06F 21/10 726/26 |
| 2007/0261112 | A1* | 11/2007 | Todd ..................... G06F 21/577 726/11 |
| 2007/0263865 | A1 | 11/2007 | Cohen et al. |
| 2008/0222734 | A1 | 9/2008 | Redlich et al. |
| 2008/0297669 | A1 | 12/2008 | Zalweski et al. |
| 2010/0229214 | A1 | 9/2010 | Zhu et al. |
| 2012/0046070 | A1 | 2/2012 | Shin |
| 2012/0127315 | A1 | 5/2012 | Heier et al. |
| 2012/0142316 | A1 | 6/2012 | Park |
| 2012/0317565 | A1 | 12/2012 | Carrara et al. |
| 2012/0317638 | A1 | 12/2012 | Carrara et al. |
| 2014/0123208 | A1 | 5/2014 | Plagemann et al. |
| 2014/0283109 | A1 | 9/2014 | Quong |

FOREIGN PATENT DOCUMENTS

| | | |
|---|---|---|
| CN | 102104766 A | 6/2011 |
| CN | 102609660 A | 7/2012 |
| JP | 2013145511 A | 7/2013 |

OTHER PUBLICATIONS

Puttaswamy, et al., "Preserving Privacy in Location-based Mobile Social Applications", In Proceedings of the Eleventh Workshop on Mobile Computing Systems & Applications, Feb. 22, 2010, 6 pages.
"Google Chrome Extensions (Labs), Formats: Manifest Files, Google Code Labs", Published on: Oct. 19, 2011, Available at: http://web.archive.org/web/20111019061333/http://code.google.com/chrome/extensions/manifest.html.
International Search Report and Written Opinion Issued in PCT Patent Application No. PCT/US2014/053625, dated Nov. 25, 2014, 9 Pages.
PCT Search Report and Written Opinion Received for PCT Application No. PCT/US2014/053767, dated Feb. 3, 2015, 10 Pages.
Van Schoonderwoert, et al., "Taming the Embedded Tiger—Agile Test Techniques for Embedded Software", In Conference of Agile Development, Jun. 22, 2004, pp. 120-126.
Vogel, Lars, "Android Camera API—Tutorial", Published On: Jan. 2, 2013, Available at: http://www.vogella.com/tutorials/AndroidCamera/article.html.
PCT Demand and Response to International Search Report and Written Opinion, filed Mar. 11, 2015 in PCT Application No. PCT/US2014/053767, 17 pages.
Office Action dated Jun. 18, 2015 in U.S. Appl. No. 14/019,937, 26 pages.
Office Action dated Jul. 9, 2015 in U.S. Appl. No. 14/019,978, 40 pages.
Written Opinion dated Jul. 24, 2015 in International Patent Application No. PCT/US2014/053767, 5 pages.
Response to Office Action dated Sep. 15, 2015 in U.S. Appl. No. 14/019,937, 10 pages.
Response to Office Action dated Sep. 21, 2015 in U.S. Appl. No. 14/019,978, 13 pages.
Office Action dated Oct. 20, 2015 in U.S. Appl. No. 14/019,937, 29 pages.
Office Action dated Nov. 10, 2015 in U.S. Appl. No. 14/019,978, 68 pages.
International Preliminary Report on Patentability dated Oct. 27, 2015 in International Patent Application No. PCT/US2014/053767, 6 pages.
International Preliminary Report on Patentability dated Nov. 19, 2015 in International Patent Application No. PCT/US2014/053625, 10 pages.
Dufaux et al, Privacy Enabling Technology for Video Surveillance, Proc. SPIE 6250, Mobile Multimedia/Image Processing for Military and Security Applications, May 2, 2006, vol. 6250, 12 Pages.
Response to Office Action dated Jan. 7, 2016 in U.S. Appl. No. 14/019,937, 9 pages.
Response to Office Action dated Jan. 28, 2016 in U.S. Appl. No. 14/019,978, 11 pages.
Office Action dated Feb. 8, 2016 in U.S. Appl. No. 14/019,937, 21 pages.
Office Action dated Mar. 31, 2016 in U.S. Appl. No. 14/019,978, 68 pages.
Response to Office Action dated May 9, 2016 in U.S. Appl. No. 14/019,937, 7 pages.
Notice of Allowance dated Jun. 17, 2016 in U.S. Appl. No. 14/019,937, 19 pages.
Response to Office Action dated Jun. 30, 2016 in U.S. Appl. No. 14/019,978, 12 pages.
Final Office Action dated Aug. 12, 2016 in U.S. Appl. No. 14/019,978, 80 pages.
Response to Final Office Action dated Oct. 5, 2016 in U.S. Appl. No. 14/019,978, 15 pages.
Notice of Allowance dated Jan. 4, 2017 in U.S. Appl. No. 14/019,978, 6 pages.
"First Office Action and Search Report Issued in Chinese Patent Application No. 201480048868.7", dated Nov. 28, 2017, 15 Pages.
"Office Action Issued in Mexican Patent Application No. MX/a/2016/002839", dated Aug. 17, 2017, 7 Pages.
"Third Office Action Issued in Chinese Patent Application No. 201480048868.7", dated Nov. 2, 2018, 6 Pages.
"Second Office Action Issued in Chinese Patent Application No. 201480048868.7", dated Jun. 11, 2018, 7 Pages.
"Office Action Issued in Russian Patent Application No. 2016107749", dated Jul. 4, 2018, 6 Pages.
Agematsu, et al., "Privacy Protection using Masquerade Pointer on Android OS", In IPSJ SIG Technical Report, May 11, 2012, 6 Pages.
"Office Action Issued in European Patent Application No. 14771665.8", dated Mar. 29, 2019, 4 Pages.
"Office Action Issued in Australian Patent Application No. 2014315395", dated Apr. 4, 2019, 4 Pages.

\* cited by examiner

VERIFICATION THAT PARTICULAR INFORMATION IS TRANSFERRED BY AN APPLICATION

CLAIM OF PRIORITY

This application is a continuation of and claims priority to U.S. patent application No. 14/019,978 filed Sep. 06, 2013, entitled "VERIFICATION THAT PARTICULAR INFORMATION IS TRANSFERRED BY AN APPLICATION", the entirety of which is incorporated herein by reference.

BACKGROUND

Computing devices may obtain information, from a user that may not be intended by the user to be disseminated to others. A user may make a choice about allowing dissemination of such information to others. The computing device may subsequently disseminate the information based on the user's choice. However, such a query about a choice often interrupts and/or distracts from a user's experience and may not be necessary.

Alternatively, legal notices may be posted before or during the user's experience that indicate how the information may or may not be disseminated. However, such legal notice posting also may interrupt and distract from a user's experience as well as not provide the information in the legal notice that is important or understandable in making an informed decision by a user.

Applications for computing devices typically are not written or coded by computing device manufacturers. Accordingly, computing device manufacturers don't know what an application does with requested information. Even when a computer device manufacturer knows that an application communicates on a network, a computer manufacturer does not know what information is transferred on the network.

SUMMARY

The technology includes a method to test whether an application transfers particular information to an external computing device. A verification (or certification) that an application is not transferring particular information to an external computing device reduces interruptions to a user to ask for consent to transfer such information, since the verification indicates no transfer occurs. Fewer prompts to a user for consent may enhance a user's experience. When a determination is made that an application is transferring particular information, a prompt for consent from a user may be provided that is accurate as well as detailed as to what particular information may be transferred and to where. In an embodiment, a user would consent to the transfer of sensitive information, such as a video signal, off the computing device, before any transfer occurs. In an embodiment, sensitive information may be a user's video clip or may be metadata containing personally identifiable information such as address information or telephone number, or other information not intended by a user to be disseminated When an application, such as a game, is loaded into a computing device, a Network Security Authorization list (NSAL) is read from the application to determine whether the application will communicate or connect with an external computing device. A NSAL may include authorized network addresses that an application may communicate with when executing on a computing device. When the NSAL does not include any network addresses, there is no need to obtain consent from a user regarding transferring the sensitive information externally because the application does not have the capability to do so. Even with a NSAL, an application may be tested or verified that sensitive information is not be transferred to an external computer. Further, when a NSAL indicates that a computing device has connectivity, a verification of what particular sensitive information is transferred and to what network address may be made.

When an application is tested and/or in a verification (or certification) process, shimming is used to intercept application calls to application programming interfaces (APIs) that return information, such as a video signal. In embodiments, a shim or shimming refers to a small library that transparently intercepts an API and changes the parameters passed, handles the operation itself, or redirects the computing operation elsewhere. In an embodiment, an application verifier may also be used. Requested sensitive information may be replaced or substituted with recorded or forged information from those APIs to produce a sentinel or canary. For example, when an application calls a "GetUserID" API, the application would typically receive a user ID such as "DavidChr." Using shimming, a substituted information, such as "XYZZY," may be returned to the application instead. Alternatively, an application may request a picture of a user from a camera in the computing device. Instead of a picture of the user, a photo of a coffee can may be provided to the requesting application.

During the testing and/or verifying, network traffic of the application may be analyzed by another shim to determine when the canary/sentinel is present in an embodiment. When the canary/sentinel is present, the APIs (and the sockets/handles passed to them) identify to what network address the canary was transmitted.

Whether false recorded information (sentinel capture) or forged information (canary forgery) is used for substituting sensitive information depends on the API and the application. Some applications may parse the sensitive information. For example, an application, such as an electronic interactive game (game), might perform image processing on the video signal returned from the camera to do their own skeletal tracking. In an embodiment, providing a video signal will allow the game to behave normally, so false recorded information, such as a video signal, may have to be recorded and searched for in the traffic.

In embodiments, false recorded information (such as videos of unmoving objects, which can be easily searched for in the traffic) may be provided. In an embodiment, a shim can detect in real time whether and where an application is exfiltrating. This allows for diagnostics to be performed on an application. For example, a crash dump may be generated and sent to an application developer for analysis.

A method to test an application includes receiving a request from the application for information. Substitute information is provided as the information to the application. A request from the application to output application information to an external computing device is received. The application information is inspected to determine whether the substitute information is included in the application information. The application information is outputted to the external computing device.

An apparatus embodiment comprises at least one camera to obtain a video signal, at least one processor and at least one processor readable memory to store an application having processor readable instructions and a network address to a computing device. The at least one processor readable memory also may store an operating system that may allow the application to transfer at least a portion of the video signal to the external computing device at the network address. The processor executes the processor readable instructions of the operating system and the application to receive, by the operating system, a request from the application for the video signal. The operating system provides a substitute video signal to the application. A request from the application to output application information to an external computing device is also received by the operating system. The operating system inspects the application information to determine whether the substitute video signal is included in the application information. The operating system outputs the application information to the external computing device.

In another embodiment, one or more processor readable memories include instructions which when executed cause one or more processors to perform a method. The method includes receiving information and a request for the information from an application. The information is replaced with substitute information. The substitute information is provided as the information to the application. A request from the application to output application information to a computing device at a network address is received. The application information is searched to determine whether the substitute information is included in the application information. The application information is outputted to the external computing device at the network address.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
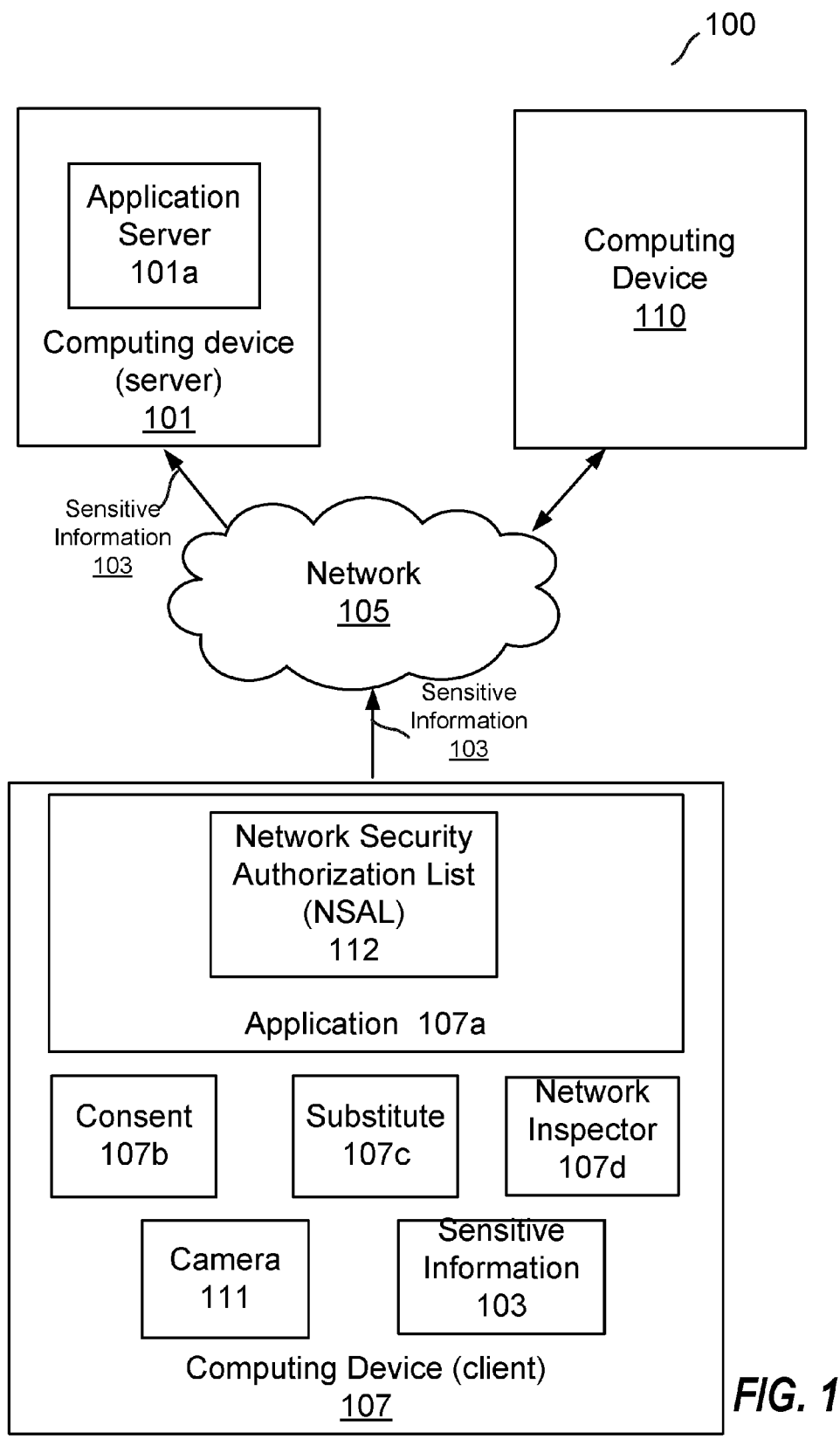
FIG. 1 is a high-level block diagram of an exemplary system architecture.

The technology includes a method to test what information, such as sensitive information, an application transfers to an external computing device. A verification (or certification) that an application is not transferring sensitive information to an external computing device reduces interruptions to a user to ask for consent to transfer such information, since the verification indicates no transfer occurs Fewer prompts to a user for consent may enhance a user's experience. When a determination is made that an application is transferring sensitive information, a prompt for consent from a user may be provided that is accurate as well as detailed in what sensitive information may be transferred and to where.

Shimming is used to intercept application calls to APIs that return sensitive information. Requested sensitive information may be replaced with substitute information, such as false recorded information or forged information, from those APIs to produce a sentinel or canary. Similarly, network traffic of the application may be analyzed by another shim to determine when the substitute information is present in the outgoing traffic of the application. When the substitute information is present, the API identifies where the application information, including the substitute information, is intended to be sent.

By using shimming, network traffic may be analyzed before possible encryption that would make it difficult to find sensitive information. For example, an application could uses Hypertext Transfer Protocol Secure (HTTPS) to communicate with an external computing device. Embodiments circumvent this by intercepting the APIs that request Secure Sockets Layer Transport Layer Security (SSL/TLS) to encrypt information.

A computing device may store or have available sensitive information that an application may request. For example, a live video signal from a camera in a console may be sensitive information requested by an application. An application, such as a game, may want to transfer the video signal to an external computing device for processing, such as overlaying a user's face in the video signal onto a character in the game.

A console may ask for a user's consent before making the sensitive information available to the game because the game may transmit the sensitive information to an external computing device contrary to a user's intentions. However, a user may not want to have to make a choice in consenting to transferring the sensitive information because it interferes with the "fun" aspect of gameplay.

The technology provides sensitive information to an application without risking the application "calling home" (transferring the sensitive information to an external computing device) without the consent of the user. Using NSAL, a computing device can identify classes of applications that do not have an ability to transfer sensitive information to an external computing device. A NSAL may include one or more network addresses to external computing devices stored in an application that may be accessed by an operating system. A NSAL is an agreed upon list or plurality of network addresses between the computing device developer and application developer in an embodiment. Those applications having a NSAL, which may include no network addresses, may be trusted which may provide an ease-of-use advantage for a computing device that wants to expose sensitive information to an application. Many applications may not include multiplayer gaming or advertising, so those applications do not need to access an external computing device.

In general, when an application loads, a computing device reads the NSAL to determine what connectivity the application has with the outside world. When the NSAL is empty (no connectivity), the application can be declared safe as the application cannot communicate a user's sensitive information to the rest of the world and there is no need to interrupt a user in obtaining consent. Even when a NSAL is empty or includes network addresses, computing device manufacturers may need to test the application to verify or certify that particular sensitive information is or is not being transferred by a particular application to an external computing device.

FIG. 1 is a high-level block diagram of a system, or apparatus 100 that tests whether an application 107a stored and executed on computing device 107 transfers sensitive information 103 to an external computing device, such as computing device 101. In an embodiment, a test may be performed during a certification or verification process of application 107a. In an embodiment, computing device 107 is included in test equipment used to test application 107. In this embodiment, network 105, computing device 101 and/or 110 may not be included.

Alternatively, a test may be performed during the execution of application 107a on a computing device 107, such as a console, before sensitive information 103 is transferred to computing device 101. In this embodiment, sensitive information 103 is not transferred unless an indication of consent from a user to transfer the information is obtained after a test indicates that application 107a intends to transfer sensitive information 103. In an embodiment, computing device 107 includes software components, such as application 107a (including NSAL 112), consent 107b, substitute 107c and network inspector 107d stored in memory of computing device 107 as described herein.

Sensitive information 103 is also stored as digital information in a memory of computing device 107. In an alternate embodiment, sensitive information 103 may be available during operation of computing device 107, such as a video signal from camera 111 when computing device 107 is powered on. In an embodiment, sensitive information 103 may be pictures or video of one or more users. In other embodiments, sensitive information may be a user's video clip or may be metadata containing personally identifiable information such as address information or telephone number, or other information not intended by a user to be disseminated from computing device 107, singly or in combination. For example, sensitive information 103 may be a video signal from camera 111 in computing device 107. The video signal may include frames or pictures of one or more users, such as video of a user while playing a game (application 107a) on computing device 107.

In an embodiment, sensitive information 103 is not obtained from a user without explicit consent from a user. Sensitive information 103 may also be viewable by a user and may be edited by a user. In an embodiment, sensitive information 103 may also be secured by storing an encrypted version of sensitive information 103 in memory as well as allowing access to sensitive information by password.

In an embodiment, computing device 107 communicates with computing device 101 located at a remote physical location by way of network 105 as described herein. Computing device 101 is considered external to computing device 107 in an embodiment. In an embodiment, application 107a may want to transfer sensitive information 103 to computing device 101 that may provide a service. Application 107a may be a game that wants to transfer the video signal (or frame of video) to a computing device 101 for a service from application server 101a. For example, application server 101a may provide a graphics overlay service or function, such as overlaying a user's face in the video signal onto a character in the game.

In an embodiment, computing device 107 also provides sensitive information 103 to computing device 101 in response to an indication of consent by a user to allow application 107a to transfer sensitive information 103 to an external computing device, such as computing device 101. When a user explicitly communicates a consent to computing device 107 in response to query, an indication of that consent may be stored as a digital value at an address of memory in computing device 108.

In an embodiment, computing device 101 may be a server having server software components and computing device 107 may be a client of computing device 101. In another embodiment, computing devices 110 and 107 are peers. In a peer-to-peer (P2P) embodiment of computing devices 101, 107 and 110, each computing device may act as a client or a server of the other.

Computing devices 101 and 107 may communicate by way of network 105 as described herein. In further embodiments, computing device 110 communicates with computing devices 101 and 107 by way of network 105. In an embodiment, network 105 may be the Internet, a Wide Area Network (WAN) or a Local Area Network (LAN), singly or in combination. In embodiments, computing devices 101, 107 and/or 110 use one or more protocols to transfer information, such as Transmission Control Protocol/Internet Protocol (TCP/IP). In embodiments, computing device 107 is included in another network. Information may be transferred by wire and/or wirelessly in network 105.

In alternate embodiments, apparatus 100 includes many more or less computing devices and/or servers to provide and receive information. In embodiments, computing device 101, computing device 110 and/or computing device 107 corresponds to computing device 1800 having exemplary hardware components illustrated in FIG. 8 and as described herein.

Figure 6:
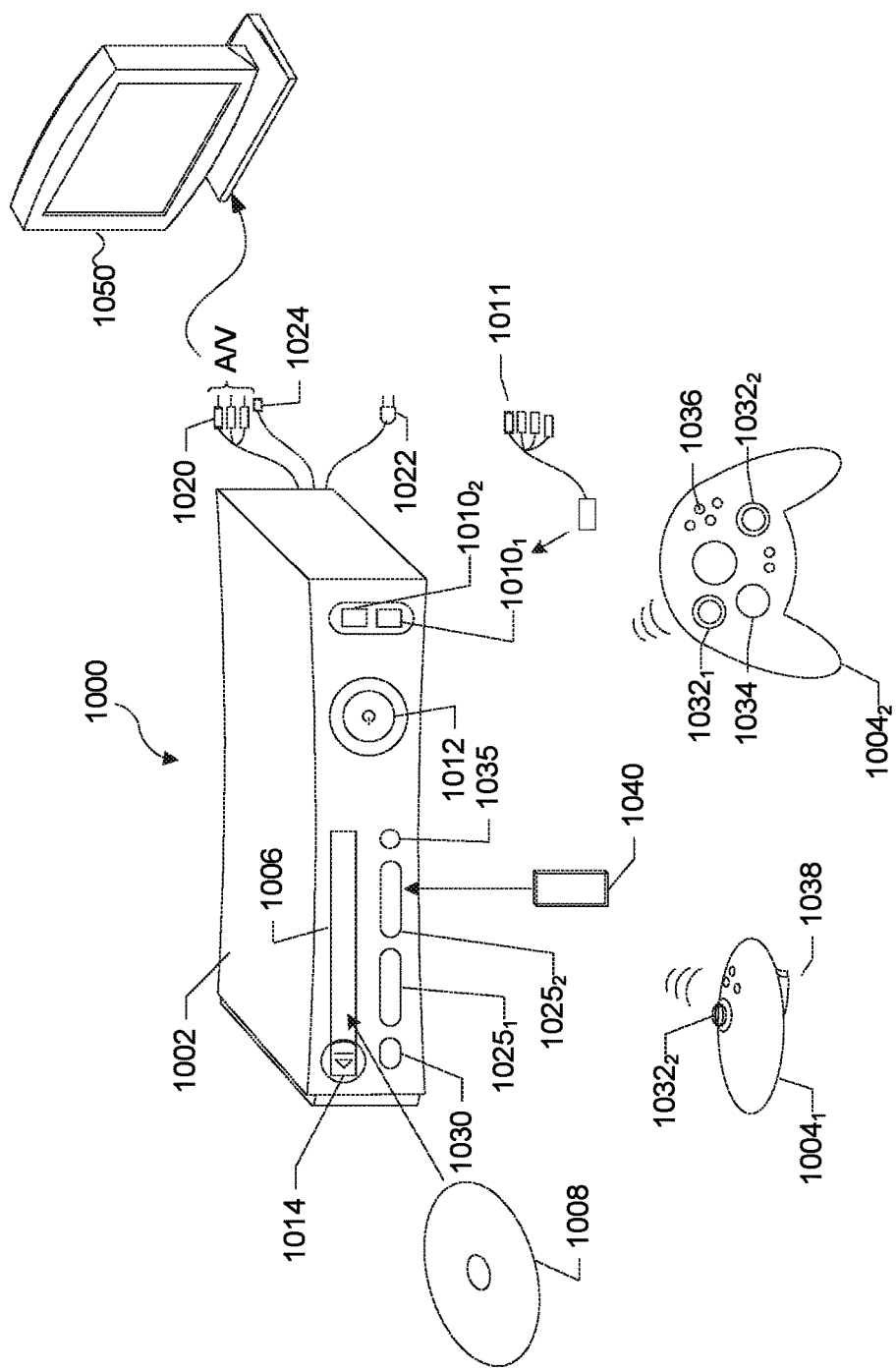
FIG. 6 is an isometric view of an exemplary gaming and media system.
Figure 7:
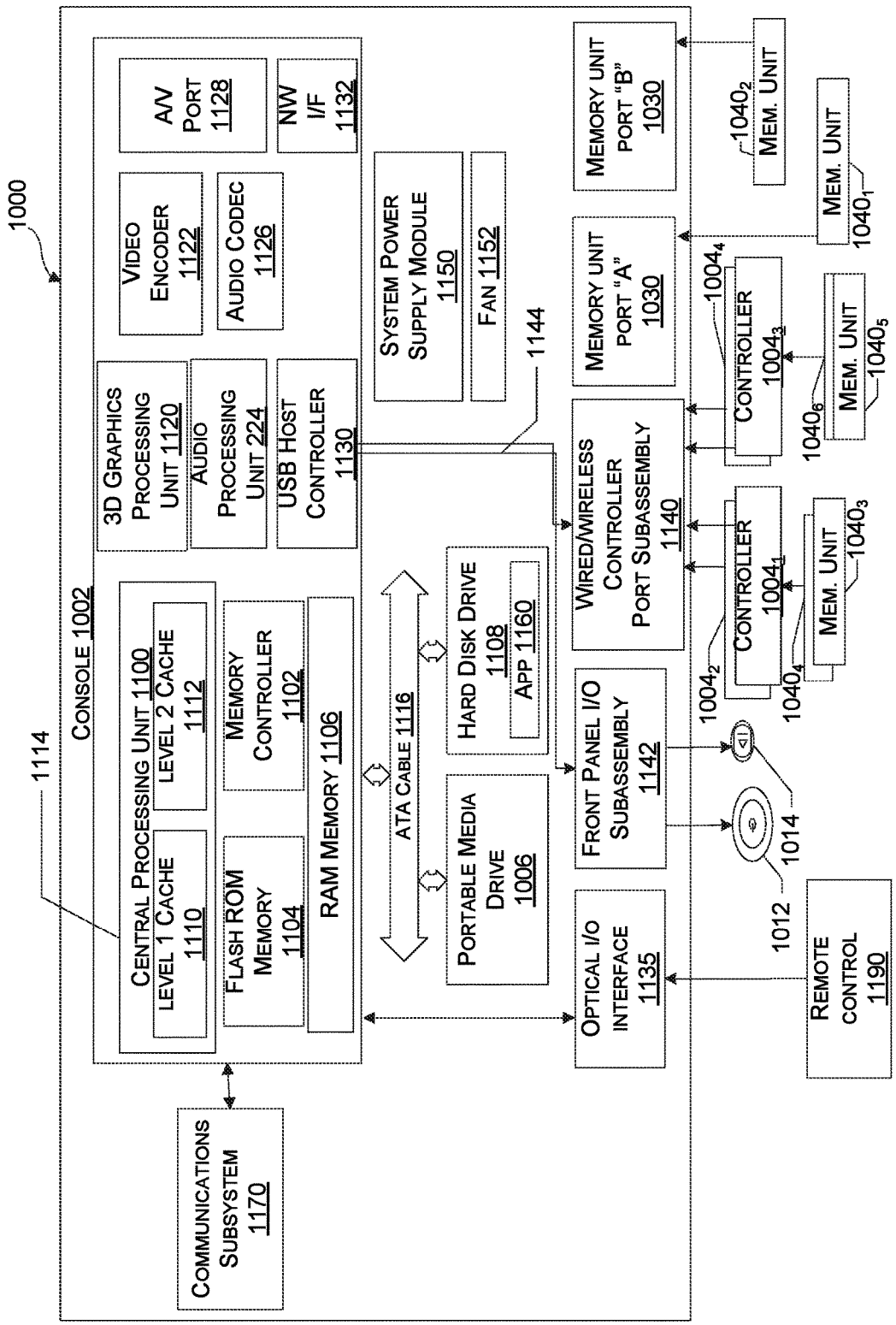
FIG. 7 is an exemplary functional block diagram of components of the gaming and media system shown in FIG. 6.
Figure 8:
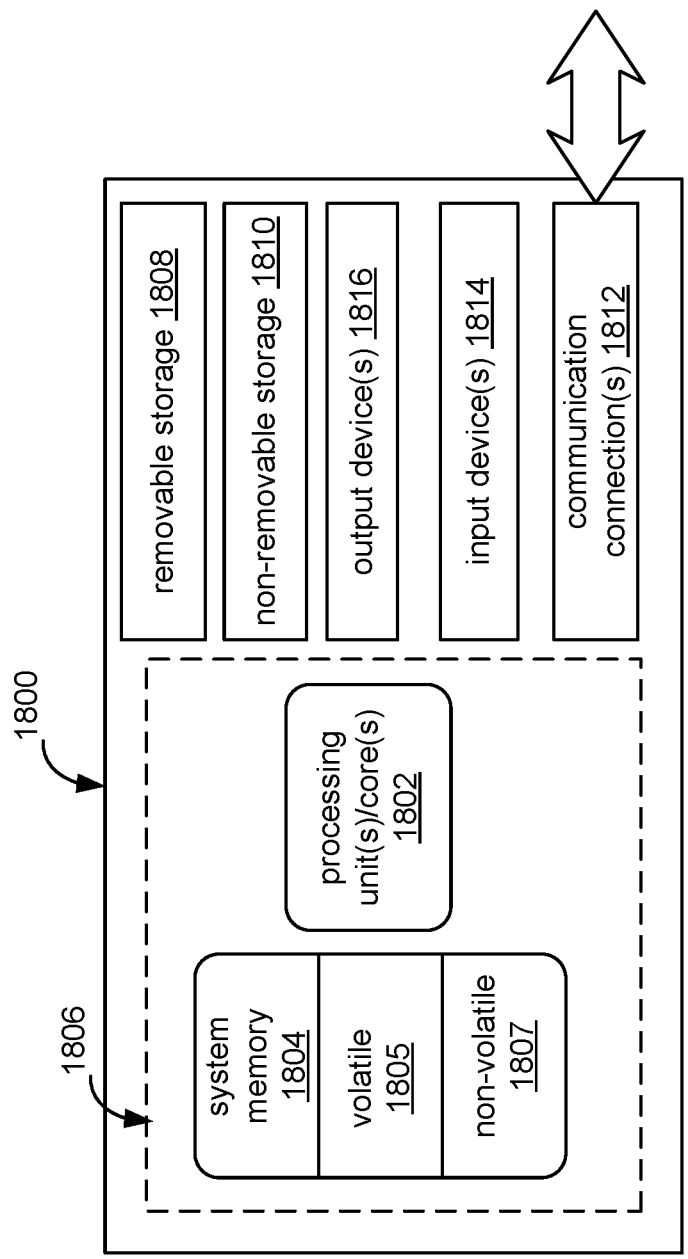
FIG. 8 is an exemplary computing device.

In an embodiment, computing device 107 is included in a console as described herein and illustrated in FIGS. 6 and 7. In an alternate embodiment, computing device 101 and/or 107 is a computing device as illustrated in FIG. 8 and described herein. In alternate embodiments, computing device 107 may be included in at least a cell phone, mobile device, embedded system, laptop computer, desktop computer, server and/or datacenter. In an embodiment, computing device 101 is a server and/or datacenter.

In embodiments, computing devices 101, 107 and 110 include one or more processor readable memories to store digital information and/or software components having processor readable instructions as described herein. In embodiments, computing device 101, 107 and 110 include one or more processors to execute or read the processor readable instructions and read the digital information.

Figure 2:
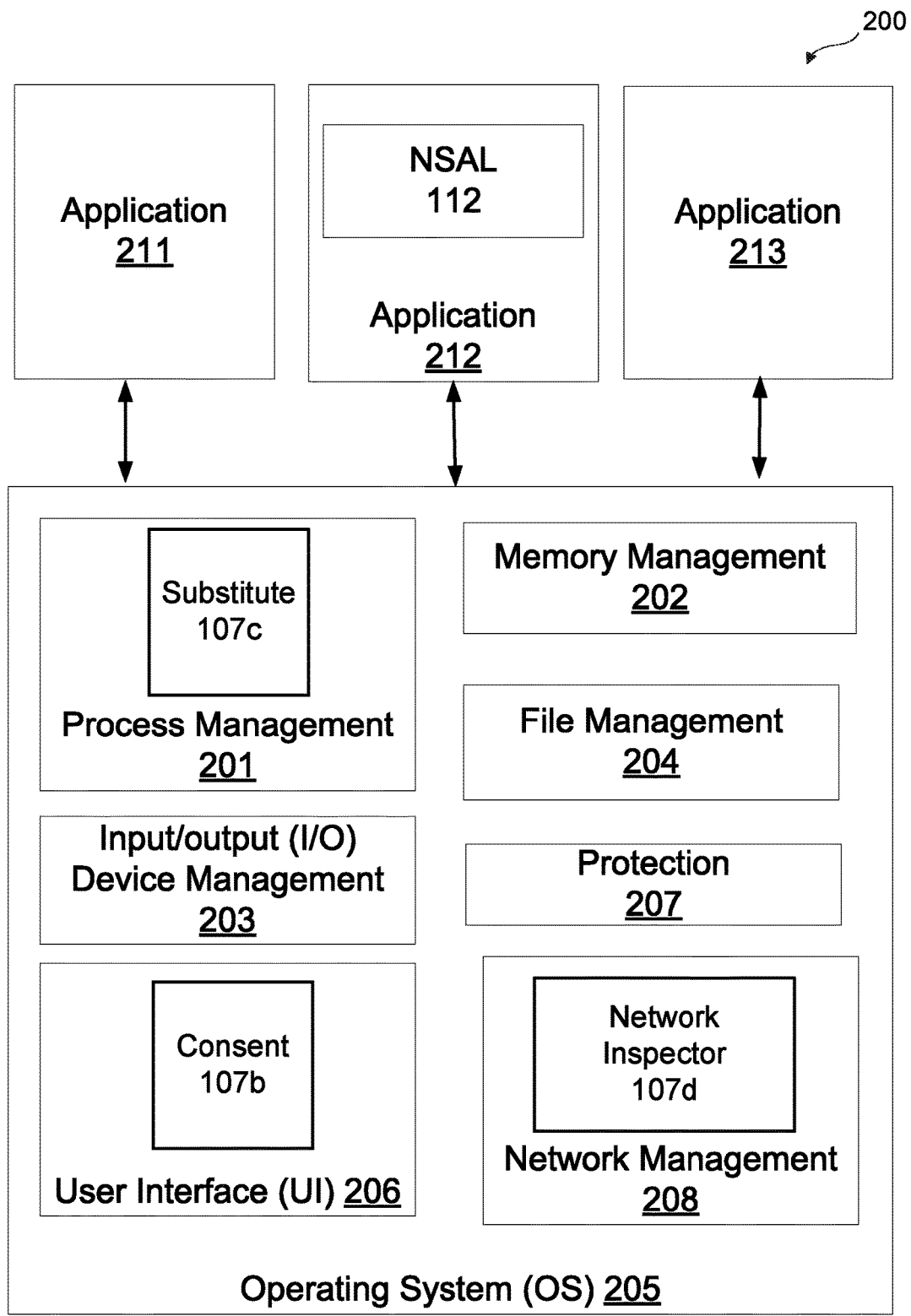
FIG. 2 is a high-level block diagram of an exemplary software architecture.

FIG. 2 is a high-level block diagram of an exemplary software architecture 200 that tests whether an application, such as applications 211-213, transfers sensitive information 103. In embodiments, Operating System (OS) 205 may be included in a computing device 107 used to verify or certify an application. In an alternate embodiment, OS 205 may be used in computing device, such as a console as described herein, to determine whether sensitive information is being transferred and then obtain a user's consent before transferring the sensitive information. OS 205 includes consent 107b, substitute 107c and network inspector 107d to test whether an application is transferring sensitive information 103 to an external computing device.

In an embodiment, network management 208 reads a NSAL 112 of application 212 in order to determine whether application 212 may receive sensitive information 103.

Figure 3:
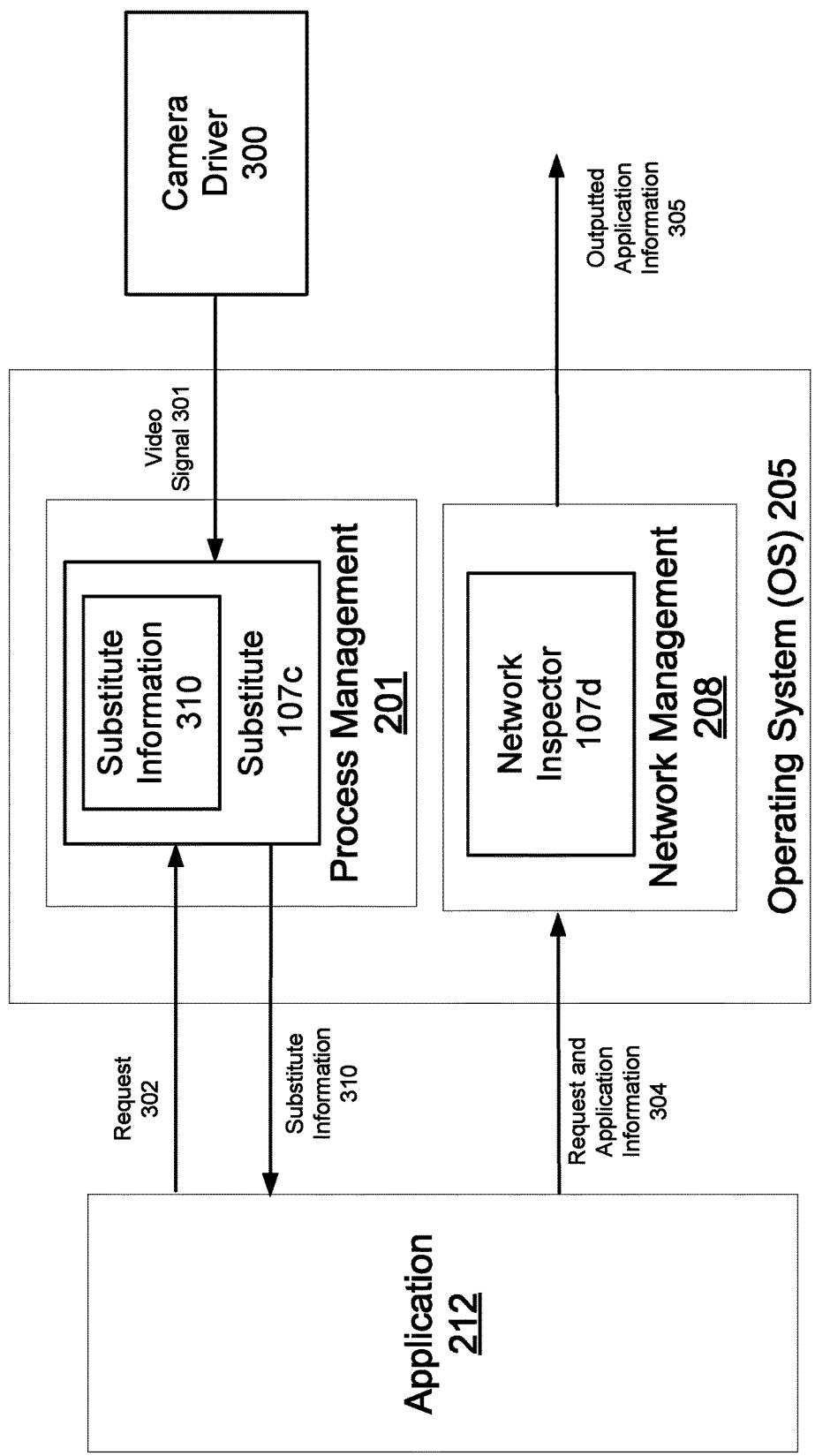
FIG. 3 is high-level block diagram of an exemplary network management and user interface software component in an exemplary operating system and application.

Substitute 107c replaces requested sensitive information from application 212 with substitute information 310 as illustrated in FIGS. 2 and 3.

Network inspector 107d then inspects or searches application information to be transferred to an external computing device for substitute information 310. When the substitute information 310 is found, a user's consent to transfer sensitive information 103 is obtained before a transfer may occur.

In an embodiment, consent 107b in UI 206 obtains and stores an indication of consent (as a digital value) from a user to transfer sensitive information 103 from application 212 to an external computing device. In embodiments, an indication of consent may include a consent to transfer the sensitive information 103 from an application 212 or a denial of consent to transfer the sensitive information 103 from an application 212. In an embodiment, applications 211-213 may include one or more electronic interactive games.

In an embodiment, OS 205 and applications 211-213 includes one or more of software components. In an embodiment, a software component may include a software program, software object, software function, software subroutine, software method, software instance, script and/or a code fragment, singly or in combination. For example, OS 205 includes one or more of user interface (UI) 206, process management 201, memory management 202, input/output (I/O) device management 203, file management 204, network management 208 and protection 207. One or more exemplary functions that may be performed by the various OS software components are described below. In alternate embodiment, more or less software components and/or functions of the software components described below may be used. In an alternate embodiment, consent 107b, substitute 107c and network inspector 107d may be included in other software components.

In embodiments, at least portions of OS 205 are stored in one or more processor readable memories. In an embodiment, at least portions of OS 205 are stored in processor readable memories of computing device 107 illustrated in FIG. 1.

Processes management 201 is responsible for creating and deleting user and system processes. Process management 201 may also be responsible for suspension and resumption of processes. Process management 201 is also responsible for synchronization and communication of processes. Process management 201 is also responsible for deadlock handling. In an embodiment, substitute 107c is included in process management 201. As described herein, substitute 107c may also be included in other software components.

Memory management 202 is responsible for keeping track of which part of memory in the different types of memory is currently being used by a particular software component or application. Memory management 202 also decides which processes are loaded into memory when memory space becomes available. Memory management also allocates and deallocates memory space as needed.

Input/output (I/O) device management 203 is responsible for managing I/O devices. For example, I/O device management 203 manages camera 111 that provides a video signal. In an embodiment, the peculiarities of specific hardware are hidden from users. In an embodiment, device drivers know the peculiarities of the specific device. For example, I/O device management 203 may be responsible for disk management functions such as free space management, memory allocation, fragmentation, removal and head scheduling.

File management 204 is responsible for creating and deleting files and directories. File management 204 may support a hierarchical file system. File management 204 may also back up files onto secondary memory.

Network management 208 is responsible for communication with networks including providing connection/routing methods. Network management 208 may also be responsible for data/process migration to other computing devices. In an embodiment, network management 208 includes network inspector 107d that inspects or searches a traffic buffer temporarily storing application information to be sent to one or more external computing devices as described herein.

Protection 207 is responsible for controlling access of software components, processes, and/or users to resources of the computing device. For example, protection 207 is responsible for controlling access to resources such as central processing unit (CPU), cycles, memory, files, and/or I/O devices. Protection 207 is also responsible for user authentication and communication.

User interface (UI) 206 provides a speech, natural language, character and/or graphics user interface to a user and is responsible for receiving input and providing output to a user. In an embodiment, UI 206 includes consent 107b that is responsible for obtaining and storing an indication of consent from a user as a digital value at an address of a memory in computing device 107.

In a console embodiment as illustrated in FIGS. 6 and 7, a user may enter input to console 1002 by way of gesture, touch or voice. In an embodiment, optical I/O interface 1135 receives and translates gestures of a user. In an embodiment, console 1002 includes a natural user interface (NUI) as user interface 206 to receive and translate voice and/or gesture inputs from a user. In an embodiment, front panel subassembly 1142 includes a touch surface and a microphone for receiving and translating a user's touch or voice, such as a user's consent, as described in detail herein. In an embodiment, user interface 206 translates spoken consent from a user provided to a microphone of console 1002 from one or more users. In an embodiment, UI 206 includes a NUI that outputs a voice asking for consent from a user and interprets a spoken answer from the user, such as consent or denial. The spoken answer, such as consent, may then be stored in memory as an indication of consent.

FIG. 3 is high-level block diagram of an exemplary network management 208 and user interface 206 in an exemplary operating system 205 and application 212. In an embodiment, OS 205 has access to sensitive information, such as video signal 301 of a user from camera driver 300. In an alternate embodiment, OS 205 has access to sensitive information stored as digital information in memory. OS 205 may provide sensitive information, such as video signal 301, to an application 212 in response to a request 302. In an embodiment, application 212 is a game that makes a request by calling a first API.

Similarly, application 212 may transfer application information to an external computing device by providing a request and application information 304 to OS 205. OS 205 then may transfer application information as outputted application information 305 to an external computing device at a network address provided by application 212. In an embodiment, request and application information 304 may include a network address of an external computing device and a video signal 301 (sensitive information) or substitute information 310. In an embodiment, request and application information 304 may include calling a second API, such as a transmit API, by application 212.

Substitute 107c includes substitute information 310 that replaces sensitive information, such as video signal 301, when application 212 is being tested in an embodiment.

Substitute information 310 may include information as described herein, which later may be searched or inspected by network management 208, and in particular network inspector 107d. In an embodiment, substitute information 310 includes video of a non-moving object. In an embodiment, substitute 107c acts as a shim for a call of an API to provide sensitive information by application 212. In an embodiment, substitute 107c is included in process management 201. In alternate embodiments, substitute 107c is included in I/O device management 203 as a false device driver. In other embodiments, substitute 107c is included in application 212 using shimmable Dynamic Link Libraries (DLLs) provided to application 212 by OS 205.

Network inspector 107d in network management 208 searches or inspects application information in request and application information 304 for substitute information 310 in order to determine whether application 212 is attempting to transfer sensitive information to an external computing device. In an embodiment, network inspector 107d searches a traffic buffer that stores application information for substitute information 310. In an embodiment, network inspector 107d acts as a shim for a call of an API to transmit application information to an external computing device by application 212.

In an embodiment, network inspector 107d searches for sensitive information, such as video data, that has been encoded in a particular format by application 212. In an embodiment, application 212 may encode sensitive information, such as raw video data, before transferring to an external computing device due to bandwidth constraints. In an embodiment, OS 205 provides shimming or APIs to perform encoding of information for application 212 so that network inspector 107d may observe any substitute information 310 in the encoded information.

In an embodiment, network inspector 107d may be able to observe substitute information 310 when application 212 attempts to hide or encode substitute information 310.

Figure 4:
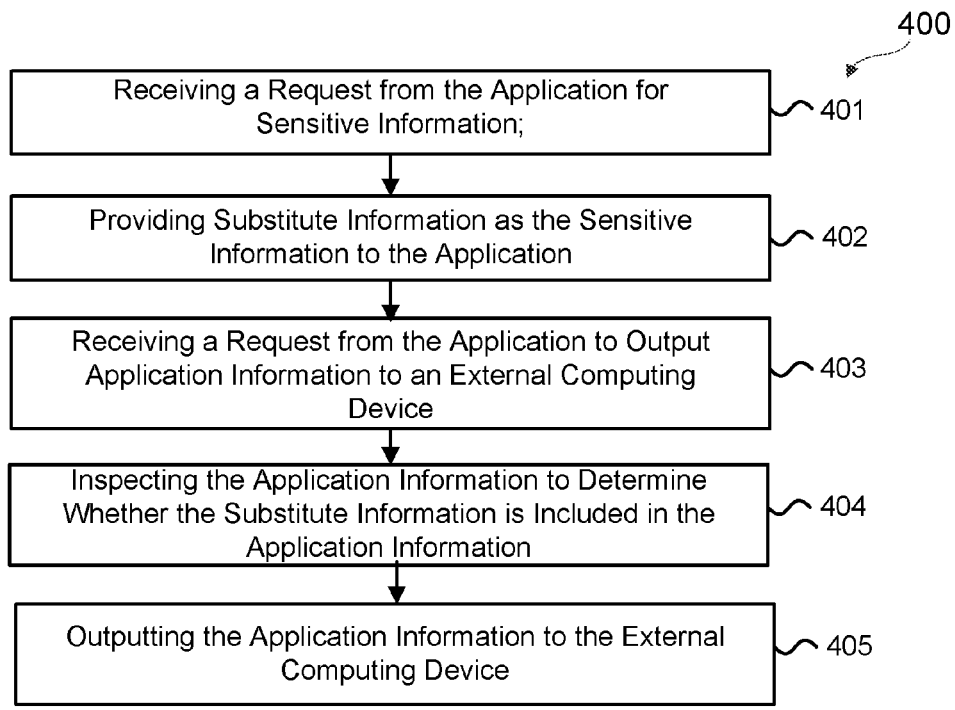
FIG. 4 is a flow chart of an exemplary method to test an application.
Figure 5A:
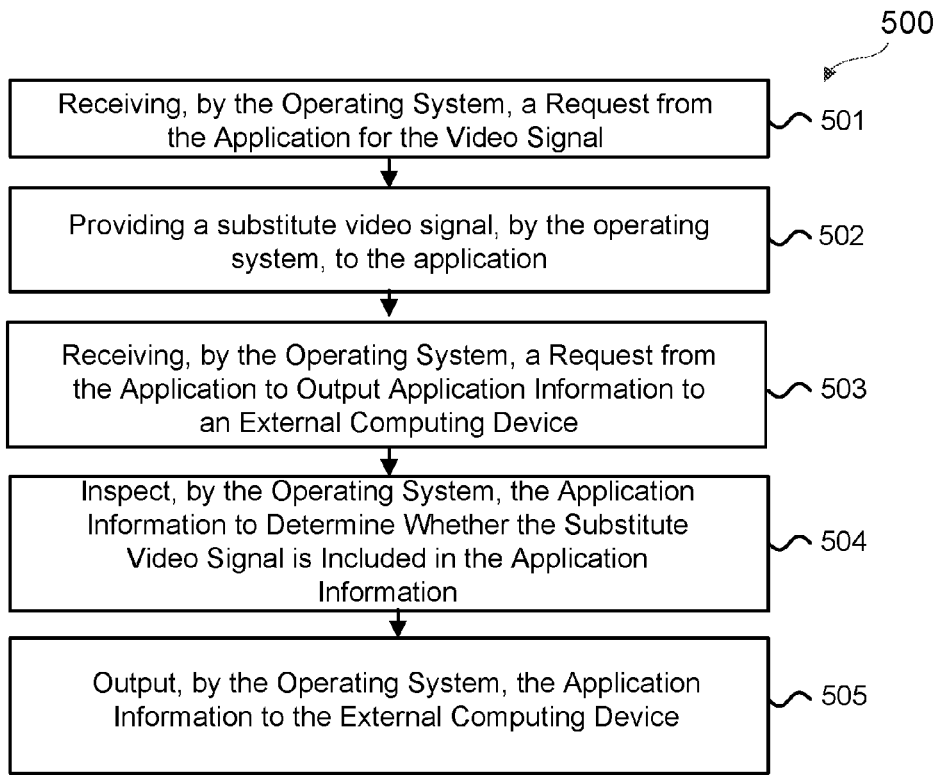
FIG. 5A is a flow chart of an exemplary method to determine whether an application outputs information, such as a video signal, to an external computing device.
Figure 5B:
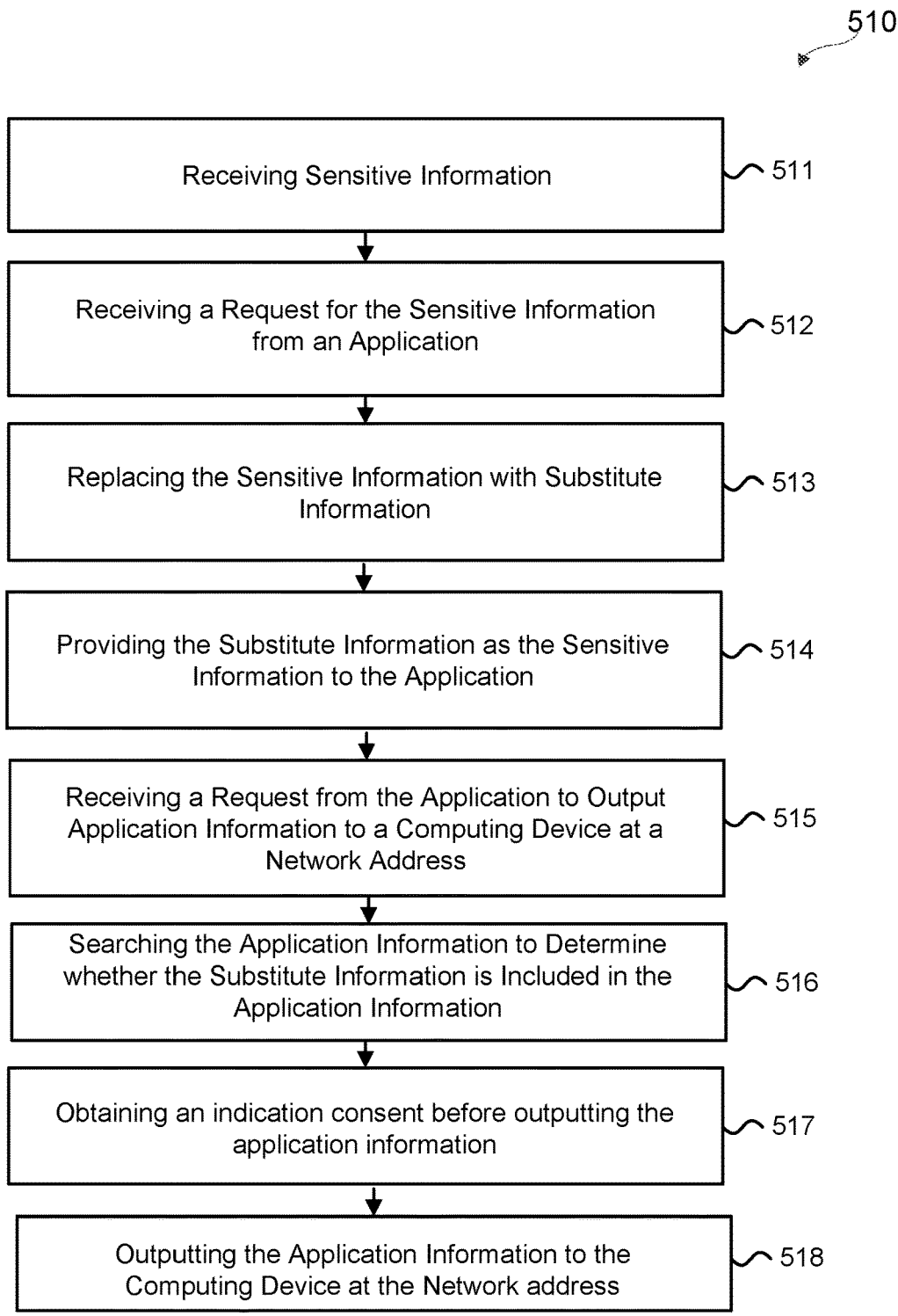
FIG. 5B is a flow chart of an exemplary method to obtain an indication of consent when an application outputs information to an external computing device.

FIGS. 4-5B are flow charts illustrating exemplary methods that determines whether an application may receive information without obtaining consent from a user. In embodiments, steps illustrated in FIGS. 4-5B represent the operation of hardware (e.g., processor, memory, circuits), software (e.g., OS, applications, drivers, machine/processor executable instructions), or a user, singly or in combination. As one of ordinary skill in the art would understand, embodiments may include less or more steps shown.

FIG. 4 is a flow chart of an exemplary method 400 to test an application. In an embodiment, method 400 is performed during verification or certification of a particular application. In an alternate embodiment, method 400 is performed before providing a consent prompt during execution of an application. In an embodiment, method 400 is performed by computing device 107, in particular at least substitute 107c and network inspector 107d are used, as illustrated in FIGS. 1-3.

Step 401 illustrates receiving a request from an application for information, such as sensitive information. In an embodiment, OS 205 receives a request by way of API from application 212 for to sensitive information 103 as illustrated in FIGS. 1 and 2

Step 402 illustrates providing substitute information as the information to the application. In an embodiment, substitute 107c obtains and replaces the information with substitute information and then returns the substitute information as sensitive information 103 to application 212 as described herein.

Step 403 illustrates receiving a request from the application to output application information to an external computing device. In an embodiment, OS 205, and in particular network manager 208, receives the request from application 212.

Step 404 illustrates inspecting the application information to determine whether the substitute information is included in the application information. In an embodiment, network inspector 107d performs step 404 by searching a buffer, such as traffic buffer, for the substitute information.

Step 405 illustrates outputting the application information to the external computing device. In an embodiment, network manager 208 at least partially performs step 405.

In other embodiments, steps 401-405 are performed by at least exemplary software components and hardware shown in FIGS. 1-3 and 6-8. For example, method 400 may be performed by console 1002 illustrated in FIGS. 6-7 or computing device 1800 illustrated in FIG. 8.

FIG. 5A is a flow chart of an exemplary method 500 to determine whether an application outputs information, such as a video signal, to an external computing device. In an embodiment, method 500 is performed during verification or certification of a particular application. In an alternate embodiment, method 500 is performed before obtaining a user's consent during execution of an application. In an embodiment, method 500 is performed by computing device 107, in particular at least substitute 107c and network inspector 107d are used, as illustrated in FIGS. 1-3.

Step 501 illustrates receiving, by the operating system, a request from an application for the video signal. In an embodiment, an application 212 uses a first API to request a video signal from operating system 205 illustrated in FIG. 2.

Step 502 illustrates providing a substitute video signal, by the operating system, to the application. In an embodiment, substitute 107c performs step 502 to replace the requested video signal with a substitute video signal, such as a video signal of a non-moving object.

Step 503 illustrates receiving, by the operating system, a request from the application to output application information to an external computing device. In an embodiment, an application 212 uses a second API to request outputting application information by operating system 205 illustrated in FIG. 2.

Step 504 illustrates inspecting, by the operating system, the application information to determine whether the substitute video signal is included in the application information. In an embodiment, network inspector 107d performs step 504 by searching a buffer, such as traffic buffer, for the substitute video signal.

Step 505 illustrates outputting, by the operating system, the application information to the external computing device. In an embodiment, network manager 208 at least partially performs step 405.

In other embodiments, steps 501-505 are performed by at least exemplary software components and hardware shown in FIGS. 1-3 and 6-8. For example, method 500 may be performed by console 1002 illustrated in FIGS. 6-7 or computing device 1800 illustrated in FIG. 8.

FIG. 5B is a flow chart of an exemplary method 510 to obtain consent of a user when an application transfers information to an external computing device. In an alternate embodiment, method 500 is performed before obtaining a user's consent during execution of an application. In an embodiment, method 500 is performed by computing device 107, in particular at least substitute 107c and network inspector 107d are used, as illustrated in FIGS. 1-3.

Step 511 illustrates receiving information, such as sensitive information 103 illustrated in FIG. 1 and described herein. In an embodiment, an operating system, such as OS 205 accesses, receives or controls the sensitive information until releasing or transferring the sensitive information to a requesting application, such as application 212. In an embodiment, a camera 111 provides a video signal that is received by computing device 107 as illustrated in FIG. 1.

Step 512 illustrates receiving a request for the sensitive information from an application. In an embodiment, an application 212 uses a first API to request sensitive information 103 from operating system 205 illustrated in FIG. 2.

Step 513 illustrates replacing the sensitive information with substitute information. In an embodiment, substitute 107c performs step 513 to replace the requested sensitive information with substitute information as described herein.

Step 514 illustrates providing the substitute information as the sensitive information to the application. In an embodiment, an application 212 uses a second API to request outputting application information by operating system 205 illustrated in FIG. 2.

Step 515 illustrates receiving a request from the application to output application information to a network address. In an embodiment, an application 212 uses a second API to request outputting application information by operating system 205 illustrated in FIG. 2.

Step 516 illustrates searching the application information to determine whether the substitute information is included in the application information. In an embodiment, network inspector 107d performs step 516 by searching a buffer, such as traffic buffer, for the substitute information.

Step 517 illustrates obtaining an indication of consent before outputting the application information. In an embodiment, consent 107b obtains an indication of consent from a user. In an embodiment, an application may be notified by the operating system to request sensitive information again and also request an output of application information again so that substitute information will not be used after receiving a user's consent.

Step 518 outputting the application information (without the substitute information) to the external address. In an embodiment, network manager 208 at least partially performs step 518.

In other embodiments, steps 511-518 are performed by at least exemplary software components and hardware shown in FIGS. 1-3 and 6-8. For example, method 510 may be performed by console 1002 illustrated in FIGS. 6-7 or computing device 1800 illustrated in FIG. 8.

In an embodiment, computing device 107 may be, but is not limited to, a video game and/or media console. In an embodiment, computing device 107 tests an application, such as a game, before sensitive information is transferred to an external computing device. When sensitive information is to be transferred, computing device 107 as a video game and/or media console obtains an indication of consent from a user before the sensitive information is transferred.

In an embodiment, FIG. 6 will now be used to describe an exemplary video game and media console, or more generally, will be used to describe an exemplary gaming and media system 1000 that includes a game and media console. The following discussion of FIG. 6 is intended to provide a brief, general description of a suitable computing device with which concepts presented herein may be implemented. It is understood that the system of FIG. 6 is by way of example only. In further examples, embodiments describe herein may be implemented using a variety of client computing devices, either via a browser application or a software application resident on and executed by the client computing device. As shown in FIG. 6, a gaming and media system 1000 includes a game and media console (hereinafter "console") 1002. In general, the console 1002 is one type of client computing device. The console 1002 is configured to accommodate one or more wireless controllers, as represented by controllers $1004_1$ and $1004_2$. The console 1002 is equipped with an internal hard disk drive and a portable media drive 1006 that support various forms of portable storage media, as represented by an optical storage disc 1008. Examples of suitable portable storage media include DVD, CD-ROM, game discs, and so forth. The console 1002 also includes two memory unit card receptacles $1025_1$ and $1025_2$, for receiving removable flash-type memory units 1040. A command button 1035 on the console 1002 enables and disables wireless peripheral support.

As depicted in FIG. 6, the console 1002 also includes an optical port 1030 for communicating wirelessly with one or more devices and two USB ports $1010_1$ and $1010_2$ to support a wired connection for additional controllers, or other peripherals. In some implementations, the number and arrangement of additional ports may be modified. A power button 1012 and an eject button 1014 are also positioned on the front face of the console 1002. The power button 1012 is selected to apply power to the game console, and can also provide access to other features and controls, and the eject button 1014 alternately opens and closes the tray of a portable media drive 1006 to enable insertion and extraction of an optical storage disc 1008.

The console 1002 connects to a television or other display (such as display 1050) via A/V interfacing cables 1020. In one implementation, the console 1002 is equipped with a dedicated A/V port configured for content-secured digital communication using A/V cables 1020 (e.g., A/V cables suitable for coupling to a High Definition Multimedia Interface "HDMI" port on a high definition display 1050 or other display device). A power cable 1022 provides power to the console 1002. Console 1002 may be further configured with broadband capabilities, as represented by a cable or modem connector 1024 to facilitate access to a network, such as the Internet. The broadband capabilities can also be provided wirelessly, through a broadband network such as a wireless fidelity (Wi-Fi) network.

Each controller 1004 is coupled to the console 1002 via a wired or wireless interface. In the illustrated implementation, the controllers 1004 are USB-compatible and are coupled to the console 1002 via a wireless or USB port 1010. The console 1002 may be equipped with any of a wide variety of user interaction mechanisms. In an example illustrated in FIG. 6, each controller 1004 is equipped with two thumb sticks $1032_1$ and $1032_2$, a D-pad 1034, buttons 1036, and two triggers 1038. These controllers are merely representative, and other known gaming controllers may be substituted for, or added to, those shown in FIG. 6.

In an embodiment, a user may enter input to console 1002 by way of gesture, touch or voice. In an embodiment, optical I/O interface 1135 receives and translates gestures of a user. In an embodiment, optical I/O interface includes a camera to obtain a video signal, of for example users. In another embodiment, console 1002 includes a NUI to receive and translate voice and gesture inputs from a user. In an alternate embodiment, front panel subassembly 1142 includes a touch surface and a microphone for receiving and translating a touch or voice, such as consent of a user. In an embodiment front panel subassembly 1142 includes a speaker to ask a user for an indication of consent (or denial) to allow sensitive information to be communicated to external computing devices.

In an embodiment, multiple microphones 1011 may be plugged into a USB port 1010 to provide a four channel signal representing a user's speech. In alternate embodiments, a single microphone may be used. In an embodiment, four 16 kHz 24 bit audio signals are provided from multiple microphones 1011 to USB port 1010 and at least one audio pipeline. In an embodiment, the at least one audio pipeline reduces noise associated with the at least one audio signal, such as other users speaking or audio from an electronic interactive game application.

In one implementation, a memory unit (MU) 1040 may also be inserted into the controller 1004 to provide additional and portable storage. Portable MUs enable users to store game parameters for use when playing on other consoles. In this implementation, each controller is configured to accommodate two MUs 1040, although more or less than two MUs may also be employed.

The gaming and media system 1000 is generally configured for playing games stored on a memory medium, as well as for downloading and playing games, and reproducing pre-recorded music and videos, from both electronic and hard media sources. With the different storage offerings, titles (or applications) can be played from the hard disk drive, from an optical storage disc media (e.g., 1008), from an online source, or from MU 1040. Samples of the types of media that gaming and media system 1000 is capable of playing include:

Game titles or applications played from CD, DVD or higher capacity discs, from the hard disk drive, or from an online source.

Digital music played from a CD in portable media drive 1006, from a file on the hard disk drive or solid state disk, (e.g., music in a media format), or from online streaming sources.

Digital audio/video played from a DVD disc in portable media drive 1006, from a file on the hard disk drive (e.g., Active Streaming Format), or from online streaming sources.

During operation, the console 1002 is configured to receive input from controllers 1004 and display information on the display 1050. For example, the console 1002 can display a user interface on the display 1050 to allow a user to select an electronic interactive game using the controller 1004 and display state solvability information. In an embodiment, console 1002 provides a menu to display 1050 to enable a selection of consent (or denial) by controllers 1004 to allow sensitive information to be communicated to external computing devices. In embodiments, a menu may be very broad such as not consenting or consenting to transferring any sensitive information from any application. Alternatively, the menu may allow a user to select or consent to particular information that may be transferred by a particular application. For example, a menu may allow a user to consent to a video signal to be transferred from a game, but the game may not transfer credit card information.

In an embodiment, a menu to obtain consent for a user is provided after a test, certification or verification process for an application. In an alternate embodiment, a menu to obtain consent for a user is provided during the execution of the application and before sensitive information is transferred to an external computing device.

FIG. 7 is a functional block diagram of the gaming and media system 1000 and shows functional components of the gaming and media system 1000 in more detail. The console 1002 has a CPU 1100, and a memory controller 1102 that facilitates processor access to various types of memory, including a flash ROM 1104, a RAM 1106, a hard disk drive or solid state drive 1108, and the portable media drive 1006. In alternate embodiments, other types of volatile and non-volatile memory technologies may be used. In one implementation, the CPU 1100 includes a level 1 cache 1110 and a level 2 cache 1112, to temporarily store data and hence reduce the number of memory access cycles made to the hard drive 1108, thereby improving processing speed and throughput.

The CPU 1100, the memory controller 1102, and various memories are interconnected via one or more buses. The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 1100, the memory controller 1102, the ROM 1104, and the RAM 1106 are integrated onto a common module 1114. In this implementation, the ROM 1104 is configured as a flash ROM that is connected to the memory controller 1102 via a PCI bus and a ROM bus (neither of which are shown). The RAM 1106 is configured as multiple Double Data Rate Synchronous Dynamic RAM (DDR SDRAM) or faster data rate DRAM modules that are independently controlled by the memory controller 1102 via separate buses. The hard disk drive 1108 and the portable media drive 1006 are shown connected to the memory controller 1102 via the PCI bus and an AT Attachment (ATA) bus 1116. However, in other implementations, dedicated data bus structures of different types can also be applied in the alternative.

In another embodiment, at least CPU 1100, level 1 cache 1110, level 2 cache 1112, memory controller 1102 and RAM memory 1106 are included in a System on a Chip (SoC). In an embodiment, CPU 1100 is replaced with processor cores. In an embodiment, RAM memory 1106 is replaced with high performance memory, such as Wide I/O DRAM and the function of memory controller 1102 is performed by processor cores. Another type of memory that is not high performance memory, such as LPDDR3 DRAM, may be coupled to a SoC in an embodiment.

A SoC (a.k.a. SOC) is an integrated circuit (IC) that integrates electronic components and/or subsystems of a computing device or other electronic system into a single semiconductor substrate and/or single chip housed within a single package. For example, memory that was previously in a memory module subsystem in a personal computer (PC) may now be included in a SoC. Similarly, memory control logic may be included in a processor of a SoC rather than in a separately packaged memory controller.

As one of ordinary skill in the art would appreciate, other electronic components may be included in a SoC. A SoC may include digital, analog, mixed-signal, and/or radio frequency circuits—one or more on a single semiconductor substrate. A SoC may include oscillators, phase-locked loops, counter-timers, real-time timers, power-on reset generators, external interfaces (for example, Universal Serial Bus (USB), IEEE 1394 interface (FireWire), Ethernet, Universal Asynchronous Receiver/Transmitter (USART) and Serial Peripheral Bus (SPI)), analog interfaces, voltage regulators and/or power management circuits.

In alternate embodiments, a SoC may be replaced with a system in package (SiP) or package on package (PoP). In a SiP, multiple chips or semiconductor substrates are housed in a single package. In a SiP embodiment, processor cores would be on one semiconductor substrate and high performance memory would be on a second semiconductor substrate, both housed in a single package. In an embodiment, the first semiconductor substrate would be coupled to the second semiconductor substrate by wire bonding.

In a PoP embodiment, processor cores would be on one semiconductor die housed in a first package and high performance memory would be on a second semiconductor die housed in a second different package. The first and second packages could then be stacked with a standard interface to route signals between the packages, in particular the semiconductor dies. The stacked packages then may be coupled to a printed circuit board having memory additional memory as a component in an embodiment.

In embodiments, processor cores includes multiple processors that executes (or reads) processor (or machine) readable instructions stored in processor readable memory. An example of processor readable instructions may include an OS and/or an application for computing device 107 (such as OS 205 and applications 211-213 shown in FIG. 2). Processor cores may use high performance memory and additional memory in response to executing processor readable instructions of an OS and application. In an embodiment, processor cores may include a processor and memory controller or alternatively a processor that also performs memory management functions similarly performed by a memory controller. Processor cores may also include a controller, graphics-processing unit (GPU), digital signal processor (DSP) and/or a field programmable gate array (FPGA). In an embodiment, high performance memory is positioned on top of a processor cores.

In embodiments, high performance memory and additional memory are include in one or more arrays of memory cells in an IC disposed on separate semiconductor substrates. In an embodiment, high performance memory and additional memory are included in respective integrated monolithic circuits housed in separately packaged devices. In embodiments, high performance memory and additional memory may include volatile and/or non-volatile memory.

Types of volatile memory include, but are not limited to, dynamic random access memory (DRAM), molecular charge-based (ZettaCore) DRAM, floating-body DRAM and static random access memory ("SRAM"). Particular types of DRAM include double data rate SDRAM ("DDR"), or later generation SDRAM (e.g., "DDRn").

Types of non-volatile memory include, but are not limited to, types of electrically erasable program read-only memory ("EEPROM"), FLASH (including NAND and NOR FLASH), ONO FLASH, magneto resistive or magnetic RAM ("MRAM"), ferroelectric RAM ("FRAM"), holographic media, Ovonic/phase change, Nano crystals, Nanotube RAM (NRAM-Nantero), MEMS scanning probe systems, MEMS cantilever switch, polymer, molecular, nano-floating gate and single electron.

A three-dimensional graphics processing unit 1120 and a video encoder 1122 form a video processing pipeline for high speed and high resolution (e.g., High Definition) graphics processing. Data are carried from the graphics processing unit 1120 to the video encoder 1122 via a digital video bus. An audio processing unit 1124 and an audio codec (coder/decoder) 1126 form a corresponding audio processing pipeline for multi-channel audio processing of various digital audio formats. Audio data are carried between the audio processing unit 1124 and the audio codec 1126 via a communication link. The video and audio processing pipelines output data to an A/V (audio/video) port 1128 for transmission to a television or other display.

FIG. 7 shows the module 1114 including a USB host controller 1130 and a network interface 1132. The USB host controller 1130 is shown in communication with the CPU 1100 and the memory controller 1102 via a bus (e.g., PCI bus) and serves as host for the peripheral controllers $1004_1$-$1004_4$. The network interface 1132 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 7, the console 1002 includes a controller support subassembly 1140 for supporting the four controllers $1004_1$-$1004_4$. The controller support subassembly 1140 includes any hardware and software components to support wired and wireless operation with an external control device, such as for example, a media and game controller. A front panel I/O subassembly 1142 supports the multiple functionalities of power button 1012, the eject button 1014, as well as any LEDs (light emitting diodes) or other indicators exposed on the outer surface of console 1002. Subassemblies 1140 and 1142 are in communication with the module 1114 via one or more cable assemblies 1144. In other implementations, the console 1002 can include additional controller subassemblies. The illustrated implementation also shows an optical I/O interface 1135 that is configured to send and receive signals that can be communicated to the module 1114.

The MUs $1040_1$ and $1040_2$ are illustrated as being connectable to MU ports "A" $1030_1$ and "B" $1030_2$ respectively. Additional MUs (e.g., MUs $1040_3$-$1040_6$) are illustrated as being connectable to the controllers $1004_1$ and $1004_3$, i.e., two MUs for each controller. The controllers $1004_2$ and $1004_4$ can also be configured to receive MUs. Each MU 1040 offers additional storage on which electronic interactive games, game parameters, and other data may be stored. In some implementations, the other data can include any of a digital game component, an executable gaming application, an instruction set for expanding a gaming application, and a media file. When inserted into the console 1002 or a controller, the MU 1040 can be accessed by the memory controller 1102.

A system power supply module 1150 provides power to the components of the gaming system 1000. A fan 1152 cools the circuitry within the console 1002.

An application 1160 comprising processor readable instructions is stored on the hard disk drive 1108. When the console 1002 is powered on, various portions of the application 1160 are loaded into RAM 1106, and/or caches 1110 and 1112, for execution on the CPU 1100, wherein the application 1160 is one such example. Various applications can be stored on the hard disk drive 1108 for execution on CPU 1100. In an embodiment, application 1160 corresponds to one of applications 211-213 shown in FIG. 2, as described herein.

The console 1002 is also shown as including a communication subsystem 1170 configured to communicatively couple the console 1002 with one or more other computing devices (e.g., other consoles). The communication subsystem 1170 may include wired and/or wireless communication devices compatible with one or more different communication protocols. As non-limiting examples, the communication subsystem 1170 may be configured for communication via a wireless telephone network, or a wired or wireless local- or wide-area network. In some embodiments, the communication subsystem 1170 may allow the console 1002 to send and/or receive messages to and/or from other devices via a network such as the Internet. In specific embodiments, the communication subsystem 1170 can be used to communicate with a coordinator and/or other computing devices, for sending download requests, and for effecting downloading and uploading of digital content. More generally, the communication subsystem 1170 can enable the console 1002 to participate on peer-to-peer communications.

The gaming and media system 1000 may be operated as a standalone system by simply connecting the system to display 1050 (FIG. 6), a television, a video projector, or other display device. In this standalone mode, the gaming and media system 1000 enables one or more players to play electronic interactive games, or enjoy digital media, e.g., by watching movies, or listening to music. However, with the integration of broadband connectivity made available through network interface 1132, or more generally the communication subsystem 1170, the gaming and media system 1000 may further be operated as a participant in a larger network gaming community, such as a peer-to-peer network.

The above described console 1002 is just one example of a computing device 107 discussed above with reference to FIG. 1 and various other Figures. As was explained above, there are various other types of computing devices with which embodiments described herein can be used.

FIG. 8 is a block diagram of one embodiment of a computing device 1800 (which may correspond to computing device 107 shown in FIG. 1) which may host at least some of the software components illustrated in FIGS. 1-3. In its most basic configuration, computing device 1800 typically includes one or more processing unit(s)/core(s) 1802 including one or more CPUs and one or more GPUs. Computing device 1800 also includes system memory 1804. Depending on the exact configuration and type of computing device, system memory 1804 may include volatile memory 1805 (such as RAM), non-volatile memory 1807 (such as ROM, flash memory, etc.) or some combination of the two. This most basic configuration is illustrated in FIG. 8 by dashed line 1806. Additionally, computing device 1800 may also have additional features/functionality. For example, computing device 1800 may also include additional storage (removable and/or non-removable) including, but not limited to, magnetic or optical discs or tape. Such additional storage is illustrated in FIG. 8 by removable storage 1808 and non-removable storage 1810.

In an embodiment, computing device 1800 is used in testing whether an application transfers sensitive information to an external computing device. In an embodiment, computing device 1800 is used during a certification or verification processes of an application. In an embodiment, software components as described herein are stored in system memory and executed by processing unit(s)/core(s) 1802

Computing device 1800 may also contain communications connection(s) 1812 such as one or more network interfaces and transceivers that allow the device to communicate with other devices. Computing device 1800 may also have input device(s) 1814 such as keyboard, mouse, pen, voice input device, touch input device, gesture input device, etc. Output device(s) 1816 such as a display, speakers, printer, etc. may also be included. These devices are well known in the art so they are not discussed at length here.

In embodiments, illustrated and described signal paths are media that transfers a signal, such as an interconnect, conducting element, contact, pin, region in a semiconductor substrate, wire, metal trace/signal line, or photoelectric conductor, singly or in combination. In an embodiment, multiple signal paths may replace a single signal path illustrated in the figures and a single signal path may replace multiple signal paths illustrated in the figures. In embodiments, a signal path may include a bus and/or point-to-point connection. In an embodiment, a signal path includes control and data signal lines. In still other embodiments, signal paths are unidirectional (signals that travel in one direction) or bidirectional (signals that travel in two directions) or combinations of both unidirectional signal lines and bidirectional signal lines.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A method to test an application, the method comprising:
providing substitute information, temporarily replacing information received in a request from the application, as the information to the application using a shim;
receiving a request from the application to output application information to an external computing device;
inspecting the application information before encryption using another shim during execution of the application to determine whether the substitute information is included in the application information;
obtaining an indication of consent of a user to transfer the application information to the external computing device; and
after replacing the substitute information, outputting the application information to the external computing device after testing indicates that the application intends to transfer the application information, wherein the application information includes a video signal.

2. The method of claim 1, wherein the method is performed at least partially by at least one processor executing an operating system and the application stored on a memory in a computing device.

3. The method of claim 2, wherein the information is sensitive information.

4. The method of claim 3, wherein the method is performed during a certification or verification process of the application.

5. The method of claim 1, wherein the receiving the request from the application for the information includes the application calling a first application programming interface and receiving the request from the application to output includes the application calling a second application programming interface.

6. The method of claim 5, wherein the inspecting includes searching a buffer storing the application information to be outputted to the external computing device for the substitute information in the application information.

7. The method of claim 6, wherein the substitute information is selected from one of forged information and recorded information.

8. The method of claim 7, wherein receiving and determining is at least partially performed by an operating system,
wherein the application includes an electronic interactive game.

9. The method of claim 8, further comprising outputting the application information, after replacing the substitute information, to the external computing device after testing indicates that the application intends to transfer the application information.

10. An apparatus comprising:
at least one camera to obtain a video signal;
at least one processor; and
at least one processor readable memory to store an application having processor readable instructions and an authorization list comprising one or more authorized network addresses that the application can communicate with when executing, and the at least one processor readable memory to store an operating system that may allow the application to transfer at least a portion of the video signal to a computing device at one of the one or more authorized network addresses,
wherein the at least one processor executes the processor readable instructions of the operating system and the application to:
receive, by the operating system, a request from the application for the video signal obtained by the at least one camera,
provide a substitute video signal comprising at least one of false recorded and forged information, by the operating system, to the application,
receive, by the operating system, a request from the application to output application information to an external computing device, and
before obtaining a user consent during execution of the application, determine whether the application outputs the application information by identifying the application as a trusted or non-trusted application based on the authorization list read from the application, wherein the request from the application for the video signal includes a call to an application programming interface to retrieve the video signal and the request from the application to output application information to the external computing device includes a call to an application programming interface to output the application information to a network address of the computing device.

11. The apparatus of claim 10, wherein the apparatus further includes a traffic buffer to store the application information and the operating system inspects the application information stored in the traffic buffer to determine whether the substitute video signal is stored in the application information.

12. The apparatus of claim 11, wherein in response to identifying the application as non-trusted:

inspect, by the operating system, the application information to determine whether the substitute video signal is included in the application information, and
output, by the operating system, the application information to the external computing device when an indication of consent is obtained by a user.

13. The apparatus of claim 10, wherein the at least one processor executes the processor readable instructions of the operating system and the application such that an indication of consent occurs before the application is transferred to the external computing device.

14. One or more processor readable memories having instructions encoded thereon which when executed cause one or more processors to perform a method, the method comprising:
receiving a request for sensitive information from an application by calling a first application programming interface that returns the sensitive information;
replacing the sensitive information with substitute information by intercepting the calls to the first application programming interface using a shim;
providing the substitute information as the sensitive information to the application;
receiving a request from the application to output application information to an external computing device at a network address by calling a second application programming interface;
searching the application information, prior to encryption, to determine whether the substitute information is included in the application information using another shim to intercept the call to the second application programming interface;
after replacing the substitute information, outputting the application information to the external computing device after testing indicates that the application intends to transfer the application information; and
receiving the sensitive information, wherein the sensitive information includes at least a frame of a video signal and the substitute information is a frame of another video signal.

15. The one or more processor readable memories of claim 14, wherein receiving a request for the sensitive information from an application includes the first application programming interface to retrieve the sensitive information, and receiving a request from the application to output application information to the external computing device at the network address includes the second application programming interface to output the application information to the external computing device at the network address.

16. The one or more processor readable memories of claim 15, wherein the method further comprises receiving consent of a user before transferring the application information.

17. The one or more processor readable memories of claim 16, further comprising outputting the application information in an encrypted format to the external computing device at the network address.

* * * * *